United States Patent [19]

Ftaclas et al.

[11] Patent Number: 5,450,352
[45] Date of Patent: Sep. 12, 1995

[54] METHOD FOR REDUCING SIDELOBE IMPACT OF LOW ORDER ABERRATION IN A CORONAGRAPH

[75] Inventors: Christ Ftaclas, Brookfield; Robert R. Crout, Bethel, both of Conn.

[73] Assignee: Santa Barbara Research Center, Goleta, Calif.

[21] Appl. No.: 13,898

[22] Filed: Feb. 5, 1993

[51] Int. Cl.⁶ .......................................... G01M 11/00
[52] U.S. Cl. .................................................. 364/525
[58] Field of Search ................ 364/578, 525, DIG. 1, 364/224.8; 359/399, 601, 604, 894; 356/124, 124.5; 350/503

[56] References Cited

U.S. PATENT DOCUMENTS

| | | | |
|---|---|---|---|
| 4,620,790 | 11/1986 | Hufngel | 356/124 |
| 4,848,907 | 7/1989 | Yokokura et al. | 364/525 |
| 4,923,293 | 5/1990 | Nelles et al. | 350/503 |
| 5,120,128 | 6/1992 | Ulich et al. | 356/124 |
| 5,126,550 | 6/1992 | Lisson et al. | 356/124.5 |
| 5,164,750 | 11/1992 | Adachi | 356/124.5 |
| 5,221,834 | 6/1993 | Lisson et al. | 356/124.5 |
| 5,249,080 | 9/1993 | Watson et al. | 359/601 |

Primary Examiner—Ellis B. Ramirez
Attorney, Agent, or Firm—W. C. Schubert; W. K. Denson-Low

[57] ABSTRACT

The invention relates to a method for reducing a sidelobe impact of low order aberrations using a coronagraph (2) having an apodized occulting mask (10), comprising the steps of: (a) providing in the coronagraph (2) the apodized occulting disk (10) having a transmission profile which graduates from opaque to transparent along its radius and the negative of whose amplitude transmission is a Gaussian profile; (b) determining a predicted sidelobe impact of the aberrations from a particular mix of low order aberration measured in a system as described by the Zernike polynomials; (c) applying the coronagraph to a system point spread function using a given rms width for the Gaussian profile describing the apodized occulting mask (10) and determining an attenuation level of the aberration sidelobes; (d) scaling the Gaussian occulting mask (10) profile to a wider rms width if the sidelobe attenuation level is too low; and (e) repeating the steps (b) through (d) until the attenuation level is acceptable.

6 Claims, 6 Drawing Sheets

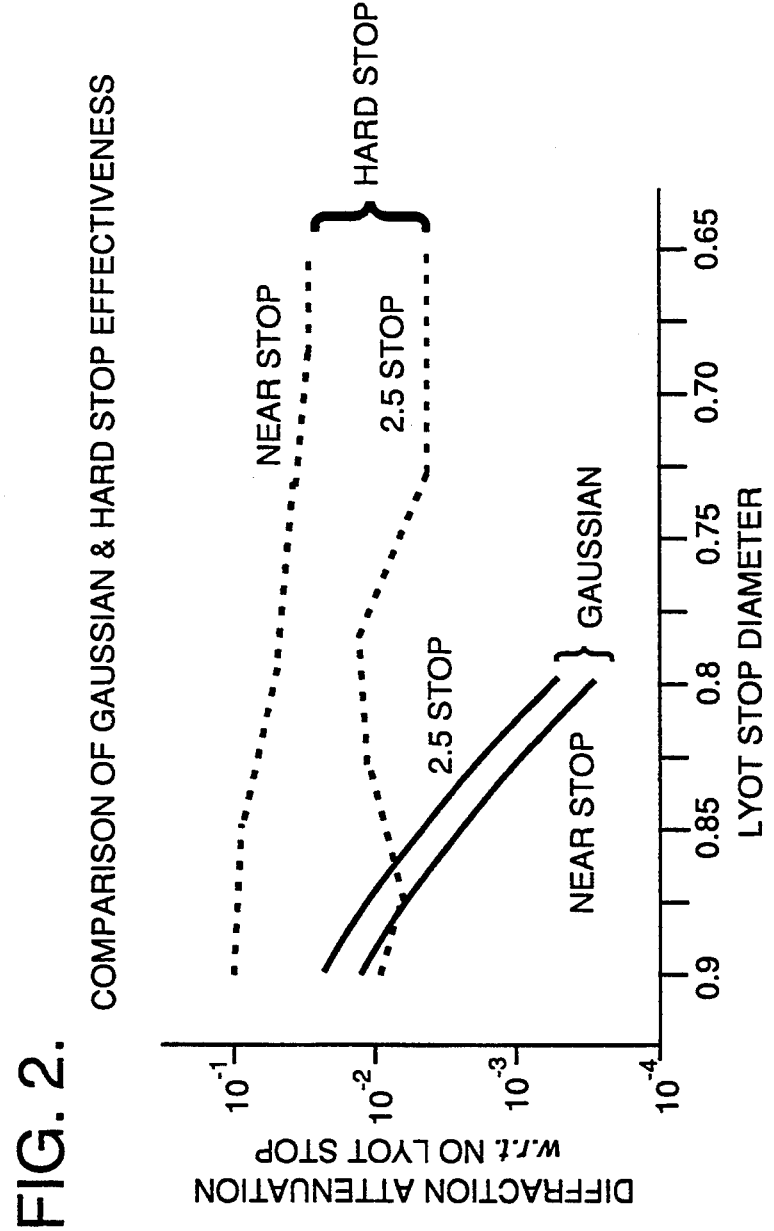

METHOD FOR REDUCING SIDELOBE IMPACT OF LOW ORDER ABERRATION IN A CORONAGRAPH

The invention described herein was made in the performance of work under NASA Contract Number 959020 and is subject to the provisions of section 305 of the National Aeronautic and Space Act of 1958 (72 Stat. 435; 42 U.S.C. 2457).

BACKGROUND OF THE INVENTION

1. Field of the Invention

This invention generally relates to a method for providing an optical instrument and, in particular, relates to a method for reducing sidelobe impact of low order aberration disk in a coronagragh.

2. Description of Prior Art

A coronagraph is an instrument originally invented to observe the Sun's corona at times other than a solar eclipse. Its action is to reduce the diffracted sidelobes of the bright solar image. It can also be used to observe unresolved sources and has found application in planned detections of extrasolar planetary systems. Planets in orbit around other stars would appear as very faint sources in orbit around the very bright central stellar source. For a solar system similar to our own the planets would be of order a billion times fainter than their parent star. The image of the bright parent star when viewed in a telescope (in fact the image of any unresolved source) under diffraction limited conditions is surrounded by a halo consisting of diffracted light from the parent star. For the nearest stars, this halo is the dominant source of background against which the much rainier planet must be imaged. For nearby stars and planets similar to our own this background could be 100,000 times brighter than the planet. In this situation, the coronagraph is employed to reduce the diffraction sidelobes of the parent star and place the planet in a more favorable brightness balance. All techniques which improve this balance aid in the detection of the planet.

A classical coronagraph 2 is shown in FIG. 1 in a demonstration breadboard. The laser and spatial filter simulate a star and the plano-convex objective simulates the aperture of the telescope observing the star. The coronagraph instrument begins at the opaque occulting mask (10) at the first focus of the system. The lens (16) reimages the entrance aperture (12) which, because of the occulting mask, now shows a concentration of diffracted light around the edge of the aperture image. This diffracted light is removed by a stop, called a Lyot stop (14), which is undersized with respect to the aperture image. The beam is then brought to a second focus at which a recording device (camera or CCD) is located. For a source occulted by the mask there is a reduction in the diffracted light halo whose magnitude depends on how much of the original image was occulted, and on how much the Lyot stop was undersized with respect to the entrance aperture. Any source which is not behind the occulting mask is essentially unaffected by the coronaograph. Thus, for the planet detection problem, the occulting mask size is limited by the need to see the planet, while still occulting its parent star. The need to undersize the Lyot stop relative to the entrance aperture of the system means that some planet fight must be lost to the stop.

The relationship between diffraction reduction, occulting mask size, and Lyot stop size is a complicated, non-linear function which can be determined for specific parameters with a numerical model. Such a performance curve is shown for a classical coronagraph as the top two curves in FIG. 2 which give the effective diffraction reduction both near the edge of the occulting mask (top-most curve), and 2.5 mask radii away from the mask edge (bottom-most of the two curves) as a function of the Lyot stop diameter scaled to the entrance aperture (also called the entrance pupil). Thus a Lyot stop diameter of 0.85 means the stop diameter was 85% of the diameter of the entrance aperture. In this case the occulting mask covered the first five diffraction rings of the diffraction pattern of the central star. This corresponds to about a half arcsecond for a meter class telescope observing a star in visible fight. This is the kind of dimension typically needed in the planetary detection problem. It is evident from the behavior of the curve that diffraction reduction of no more than a factor of one hundred can be realized by a classical coronagraph for this range of parameters. Since the occulting mask is already of the order of the dimension needed for planetary detection, and since adjusting the Lyot stop produces no appreciable improvement this is approximately the limit of performance of a classical coronagraph in the planetary detection situation.

The actual coronagraphic instrument is made up of the elements between the occulting mask 10 and the camera 22 as shown on FIG. 1. In operation, the laser 9 and spatial filter 11 are used in combination to simulate a distant star. The lens 8 and pupil 12 together simulate the telescope. Thus, the entire breadboard simulates a coronagraph on a telescope looking at a star. The beam splitters 17, 19 are mirrors that can be added or removed from the setup. When the first mirror 17 is in place, it feeds the microscope 21 and is used for alignment of the occulting mask 10 or inspection of the pupil 12. When it is not in place, the coronagraph operates normally. The second mirror 19 is added or removed depending on whether one wants to feed the film camera or TV camera.

It is known that the performance of the coronagraph can be improved by apodizing, or shaping the transmission profile of the occulting mask so that its amplitude transmission follows the profile:

$$T(r) = 1 - e^{-(r/\sigma)}$$

where $r$ is the radial coordinate in the focal plane and $\sigma$ is a free parameter to be determined. This apodization works because it the produces a greater concentration of diffracted energy in the reimaged entrance aperture rendering the application of the Lyot stop more effective. This is shown by the bottom set of curves in FIG. 2 which gives the diffraction attenuation at comparable positions to the set of curves above for an apodized occulting mask having a fifty percent intensity transmission at the same focal plane radius as the edge of the opaque occulting mask in the example above. Note that with the apodized mask, as the Lyot stop is decreased in diameter, there is a dramatic reduction in diffracted light approaching four orders of magnitude. Even with this improvement in performance it is important to note that in a real optical system, even in a space-borne environment free from the scatter effects of the Earth's atmosphere, the halo of light surrounding an unresolved source will also consist of scatter from the fabrication errors of the optical system and the sidelobe effects of the system alignment errors. These must be reduced or controlled to the same level as the reduced diffraction sidelobes in order to render the coronagraph action useful.

SUMMARY OF THE INVENTION

The invention features a method for reducing a sidelobe impact of low order aberrations using a coronagraph having an apodized occulting mask, comprising the steps of: (a) providing in the coronagraph the apodized occulting disk having a transmission profile which graduates from opaque to transparent along its radius and the negative of whose amplitude transmission is a Gaussian profile; (b) determining a predicted sidelobe impact of the aberrations from a particular mix of low order aberration measured in a system as described by the Zernike polynomials; (c) applying the coronagraph to a system point spread function using a given rms width for the Gaussian profile describing the apodized occulting mask and determining an attenuation level of the aberration sidelobes; (d) sealing the Gaussian occulting mask profile to a wider rms width if the sidelobe attenuation level is too low; and (e) repeating the steps (b) through (d) until the attenuation level is acceptable.

Other objects and advantages of the present invention will become apparent to those skilled in the art from the following detailed description of the invention read in conjunction with the appended claims and the drawings attached hereto.

BRIEF DESCRIPTION OF THE DRAWING

FIG. 2 shows a graph of diffraction attenuation as a function of Lyot stop transmission.

DETAILED DESCRIPTION OF THE INVENTION

Figure 1:
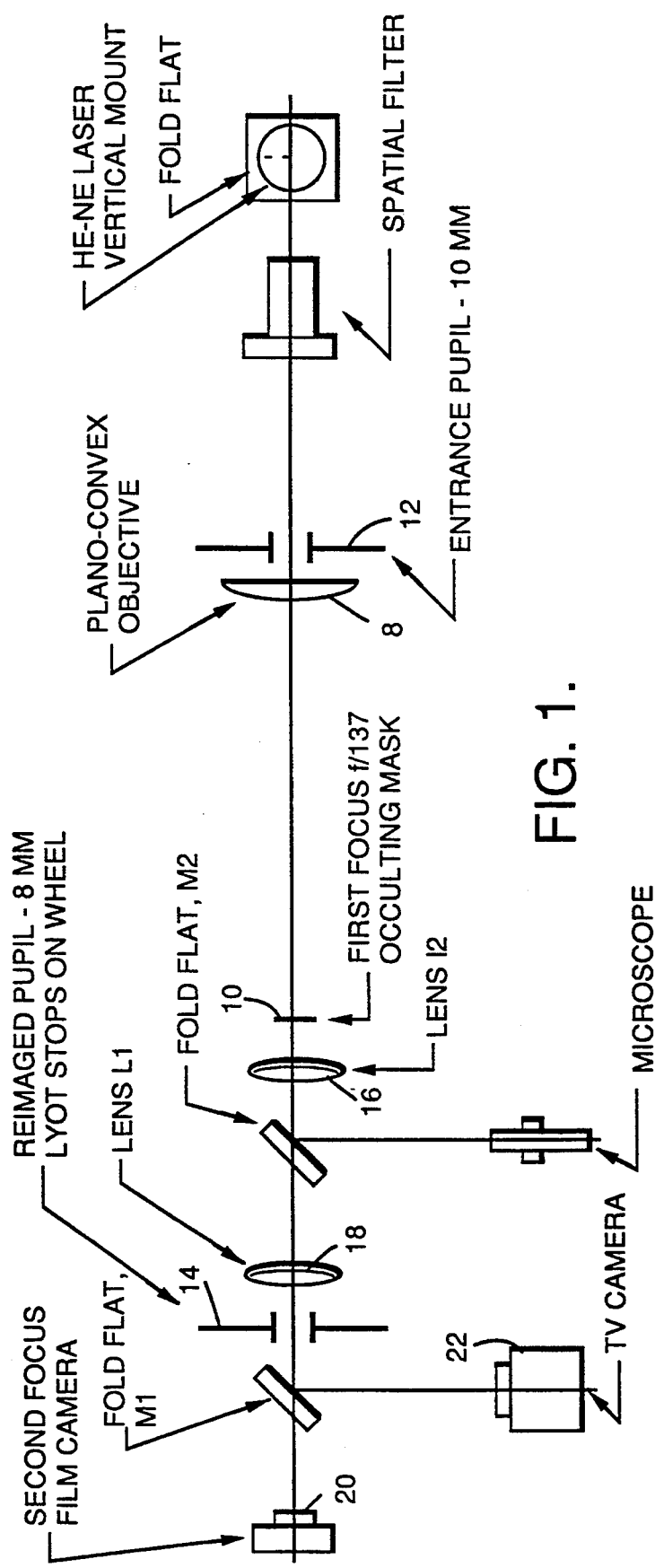
FIG. 1 show a schematic of a coronagraph.

A. Reduction of Sidelobe Impact Of Low Order Zernike Aberrations By Coronagraph

The coronagraph 2 can be improved to suppress the effect of low order aberrations on the sidelobes of a near diffraction limited point spread function.

The detection of a faint source in the proximity of a bright source is usually made more difficult by the sidelobes of the bright source. Energy is put into these sidelobes by several mechanisms including diffraction, scatter from the figure errors and the high spatial frequency tails of low order aberrations. The coronagraph of the instant application suppresses the diffraction sidelobes and can produce dramatic reductions in the scatter associated with low order aberrations.

In the coronagraph 2, the imaging system has an entrance pupil 18 with an image located at the first focus of the system. The occulting disk 10 is apodized for coveting the image at the first focus. A Lyot stop 14 applied at the re-imaged entrance pupil, and the stopped pupil is propagated to a second focal plane. For an ideal point source the apodized occulting disk 10 results in a concentration of diffracted energy at the edges of the re-imaged pupil. The Lyot stop 14 masks off this bright edge resulting in decreased sidelobes at the second focus. When the wavefront is altered by the inclusion of a small (compared to a wavelength of light) amount of low order aberration the point spread function is altered in several ways: The energy in the central lobe is reduced, the central few diffraction rings are altered with a local enhancement of energy, and a broad scatter tail is created. As the order of the aberration is increased the local energy enhancement moves out in radius.

If the apodized occulting disk 10 covers the local enhancement of energy, the coronagraph 2 will be effective in reducing the scatter sidelobes associated with the aberration. This is an important improvement for the Astrometic Imaging Telescope program (hereinafter "AIT"), but it also has general applicability to surveillance type programs where detection of faint targets is limited by the proximity of a bright source such as the Earth or the Sun. This discovery permits the impact of alignment errors on the telescope wavefront error budget to be greatly reduced. Thus the AIT can have relatively normal alignment requirements while maintaining extremely severe mid-spatial frequency figure requirements.

The invention greatly increases the range of potential uses of coronagraphs. Misalignment of a two mirror telescope generally results in some combination of focus, coma and astigmatism being generated. Without suppression of the scatter effects of these aberrations it is necessary to maintain the alignment state of the telescope at a level consistent with the required wavefront error imposed by the reduced diffraction sidelobes. This could be only a few Angstroms. With the suppression introduced by the coronagraph 2 of the invention the alignment aberrations can be much larger than allowed by the wavefront error budget since their net effect is greatly decreased.

A systems specification for low order aberrations is designed to be consistent with the overall reduction in background light expected to be created by the use of the coronagraph and super smooth optical system. One important design consideration is that the aberrations resulting from alignment of the optical instrument and manufacturing errors are an important factor which determines the systems cost, i.e. large error tolerances reduce cost, while small tolerances increase cost.

The Zernike polynomials give an excellent description of the low order aberrations of an optical system and the effects of mis-alignments within the system. They are of the form (see R. Noll, J.O.S.A., 66, 1976 for a more complete discussion):

$$\Xi_{mn} P_n(r) T_m(\theta)$$

where $P_n(r)$ is a polynomial of degree n in r ($0 \leq r \leq 1$), and $T_m(\theta)$ is $\cos(m\theta)$ [$\sin(m\theta)$] when the Zernike order is even [odd] and 1 for m=0. Thus focus is $Z_{2,0}$ and 90° astigmatism is $\Xi^e{}_{2,2}$ where the superscript denotes an even order Zernike. The more familiar Zernike terms are simply an ordering of various combinations of m, n by an index that bears no simple relationship to m and n. Some combinations of m and n, like m=3, n=0 are forbidden by the requirement for continuity at the origin. It makes most sense to think of the function $T_m(\theta)$ as representing both even and odd cases simultaneously.

One can describe an arbitrary surface F(x,y) by:

$$F(x,y) = \sum_{mn} \sigma_{mn} Z_{mn}$$

where the $\sigma_{mn}$ are obtained by projecting F onto the $Z_{mn}$. The $\sigma_{mn}$ should also be thought of as representing both even and odd cases. The pupil plane amplitude resulting from this surface is just:

$$\Lambda(\vec{k}) = \int\int C\left(\frac{r}{R}\right) e^{-\frac{2\pi i}{\lambda}\vec{k}\cdot\vec{r}} e^{\frac{4\pi i}{\lambda}\vec{F(r)}} d^2r$$

In the AIT system, it can be assumed that the aberrations are small and obtain:

$$\Lambda(\vec{k}) \approx \int\int C\left(\frac{\vec{r}}{R}\right)\left(1 - \frac{4\pi i}{\lambda}F(\vec{r})\right) e^{-\frac{2\pi i}{\lambda}\vec{k}\cdot\vec{r}} d^2r$$

or:

$$\Lambda(\vec{k}) \approx R^2 \int\int C(\vec{\alpha})\left(1 - 4\pi i \sum_{mn} \sigma_{mn} Z_{mn}(\vec{\alpha})\right) e^{-\frac{2\pi i}{\lambda}\vec{k}\cdot\vec{\alpha}} d^2\alpha$$

$$\alpha = \frac{\vec{r}}{R} \quad \Lambda \vec{k}' = R\vec{k}$$

where $\alpha = \vec{r}/R$ and $\vec{k}' = R\vec{k}/\lambda$ (2k' is the focal plane coordinate in units of $\lambda/D$) and one can now assume that the $\sigma_{mn}$ are waves of surface error. The Circle function $C(\alpha)$ simply defines the boundaries of the pupil and is just $\Xi_{00}(\alpha)$. Using the fact that all the Zernikes vanish for $\alpha > 1$ one can obtain:

$$\Lambda(\vec{k}') \approx R^2 \int\int \left(Z_{00}(\vec{\alpha}) - 4\pi i \sum_{mn} \sigma_{mn} Z_{mn}(\vec{\alpha})\right) e^{-2\pi i \vec{k}'\cdot\vec{\alpha}} d^2\alpha$$

Apart from constant multipliers this integral is just the sum of the Fourier transforms of the Zernike polynomials giving for the amplitude.

$$\Lambda(\vec{k}') \approx R^2 \left(Q_{00}(\vec{\alpha}) - 4\pi i \sum_{mn} \sigma_{mn} Q_{mn}(\vec{\alpha})\right)$$

Where the $Q_{00}$ corresponds to ideal circular pupil diffraction. The $Q_{mn}$ are given by Noll as:

$$Q_{mn}(k') = i^n \sqrt{n+1} \, \frac{2J_{n+1}(2\pi k')}{2\pi k'} \sqrt{2} \, T_m(\phi)$$

For large x the function $J_p(\chi)$ can be approximated as $\sqrt{2/\pi\chi} \cos(\chi - p\pi/2 - \pi/4)$. This approximation is already quite good for $n \leq 4$, by the third diffraction ring. This approximation gives for the $Q_{mn}$:

$$Q_{mn} = i^n \frac{\sqrt{n+1}}{k'^{3/2}} \frac{2}{\pi^2} T_m(\phi)$$

Which gives for the focal plane amplitude:

$$\Lambda(\rho,\phi) \approx \frac{\sqrt{2} \, R^2}{\pi^2} \rho^{-3/2} \left(1 + 4\pi \sum_{mn} \sqrt{n+1} \, i^{-n+1} \sigma_{mn} T_m(\phi) \cos\pi\left(p - \frac{n}{2} - \frac{3}{4}\right)\right)$$

where $\rho = 2k'$ is the focal plane radial coordinate in diffraction rings. The $Q_{mn}$ are orthonormal when integrated over the entire focal plane so the cross terms which arise in calculating the intensity at the focal plane contribute to local oscillations but make no net change in focal plane intensity. Listing only the positive definite contributors to the intensity and ignoring multiplicative constants one gets the following:

$$\theta(\rho,\phi) \approx \frac{1}{\rho^3}\left(\cos^2\pi\left(p - \frac{3}{4}\right) + \right.$$

$$\left. \sum_{nm} (n+1)\left[4\pi\sigma_{mn}T_m(\phi)\cos\pi\left(p - \frac{n}{2} - \frac{3}{4}\right)\right]^2\right)$$

Since one only wants to set limits the azimuthal variation of the intensity are of no concern and that it is known that $T_m^2 \leq 1$. Moreover, since one can take as a reference point for all calculations the ideal diffracted light levels, the phase difference in the various radially oscillating terms is of no consequence, and write:

$$\frac{\theta}{\theta_0} \approx 1 + \sum_{mn} (n+1)(4\pi\sigma_{mn})^2$$

The linearization of the focal plane into the sum of an ideal and aberrated component remains valid even when propagating through the coronagraph. This can be predicted directly from the theory and verified it by numerical experiments. The asymptotically cubic tail which characterizes all Zernike scatter terms is like diffraction in that it is a consequence of the finite pupil boundary. Therefore it follows that the coronagraph should also reduce this scatter tail to some degree. The controlling factor is the degree of occultation produced in the coronagraph. As n increases $|Q_{mn}|^2$ peaks further away from the origin so that the occulting mask is less effective at getting rid of energy. When the coronagraph is set to reduce ideal diffraction (n=0) by a factor of $10^4$ it will reduce focus (n=2, m=0) by a factor of $10^3$ and spherical aberration (n=4, m=0) by a factor of $10^2$.

The response of the coronagraph can be found by a given aberration by simply propagating its functional dependence through the coronagraph. The coronagraph will modify the scatter produced by the function and at the field angles of interest to us (0.5" to 5"). This modification is well characterized by a single scale factor for that order, $\gamma_n$, so one can write:

$$\left[\frac{\theta}{\theta_0}\right]_c \approx \gamma_0 + \sum_{mn} \gamma_n(n+1)(4\pi\sigma_{mn})^2$$

which gives the focal plane intensity levels after the action of the coronagraph in units of the ideal diffraction intensity at the first focus.

Figure 3A:
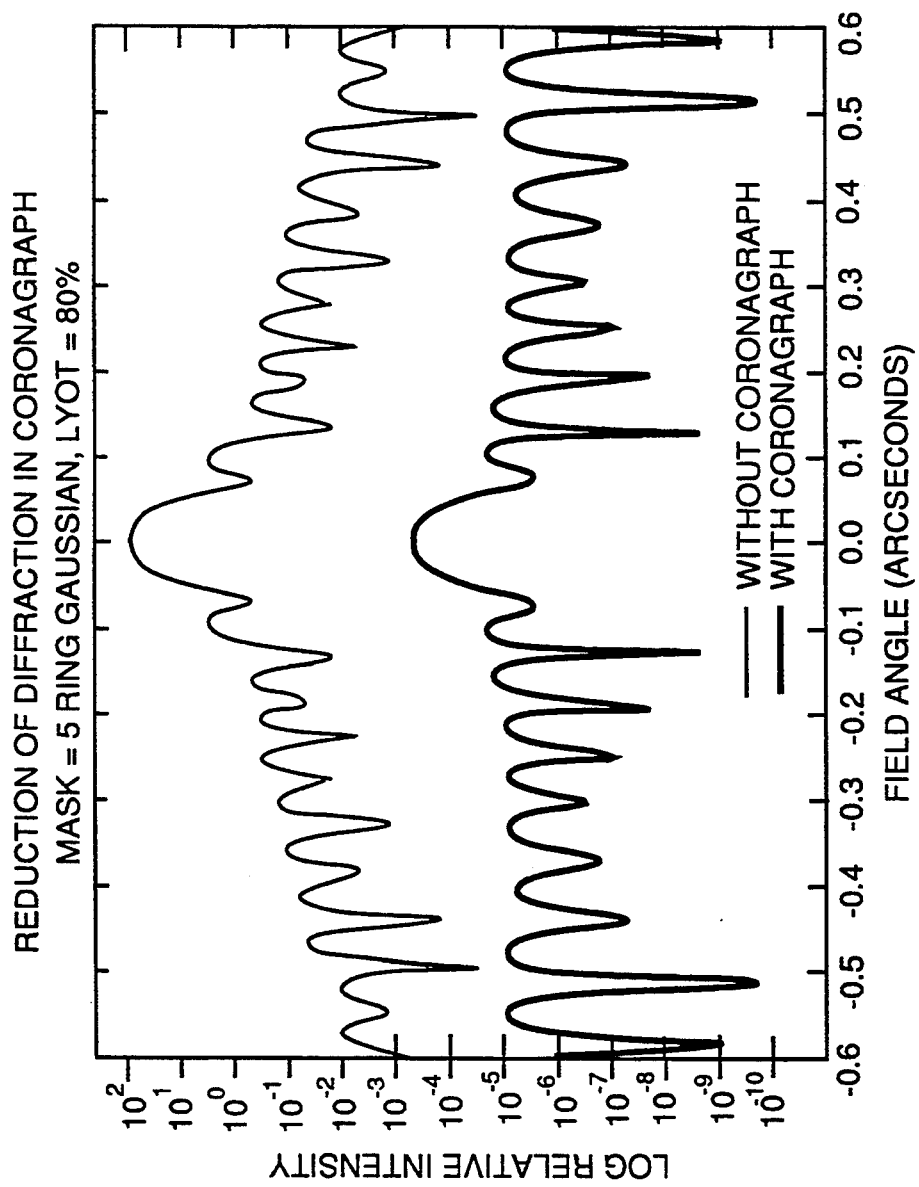
FIGS. 3a, 3b and 3c show a series of plots of the first focus plane and the second focus plane.
Figure 3B:
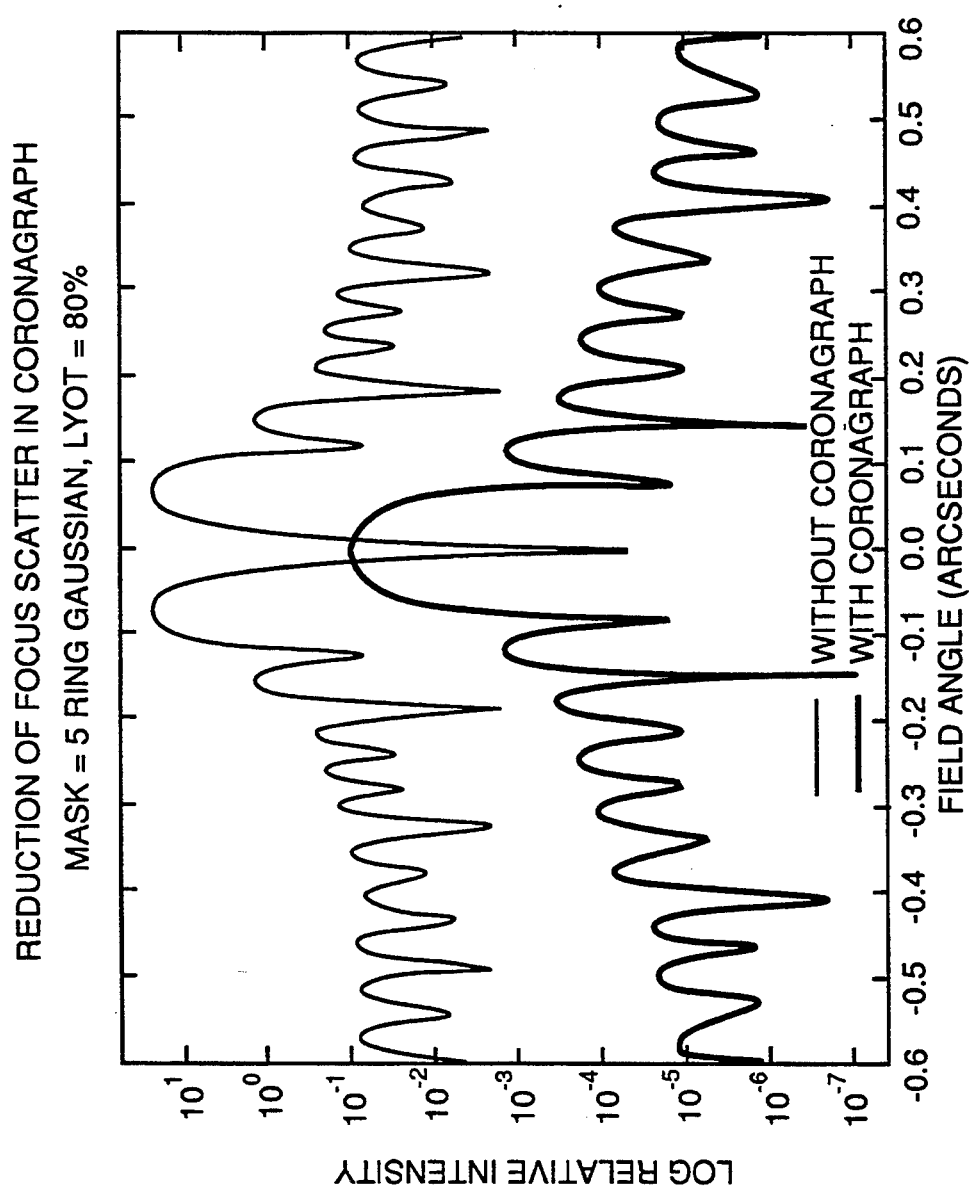
Figure 3C:
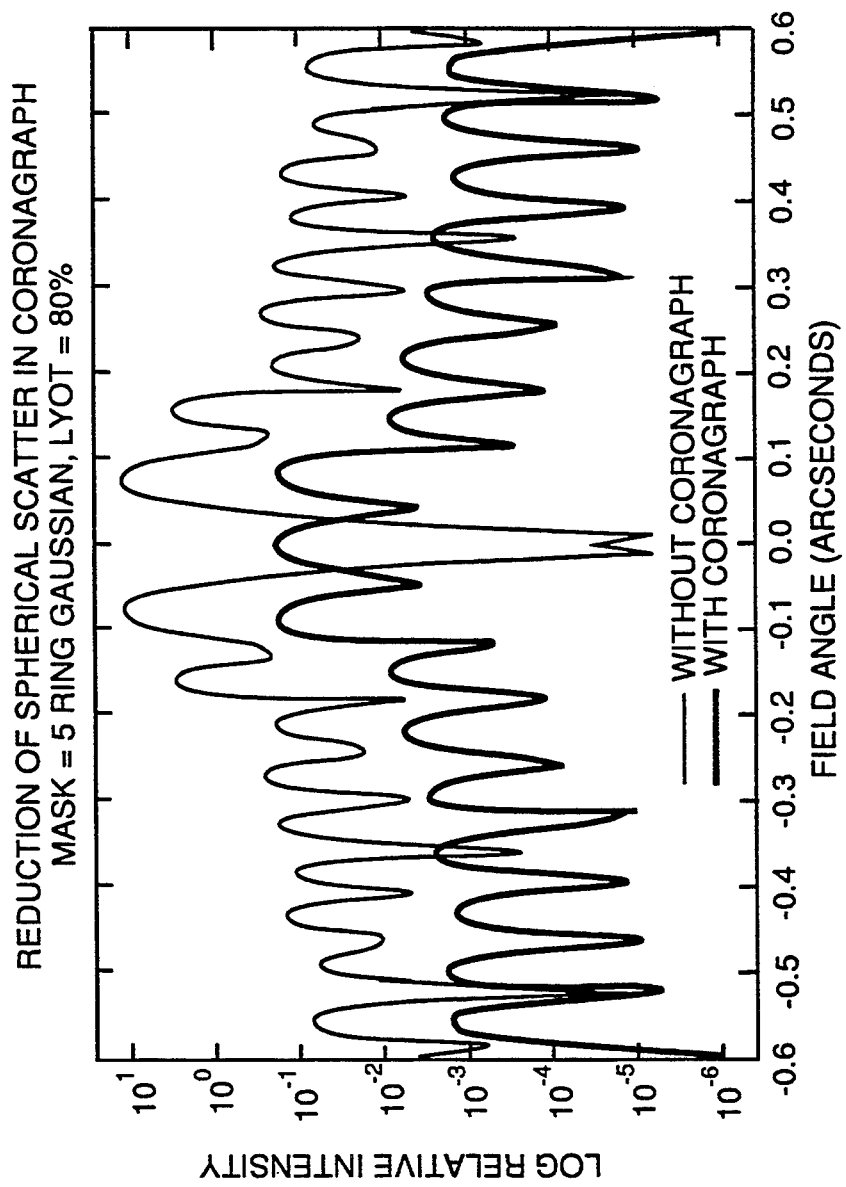
Figure 4:
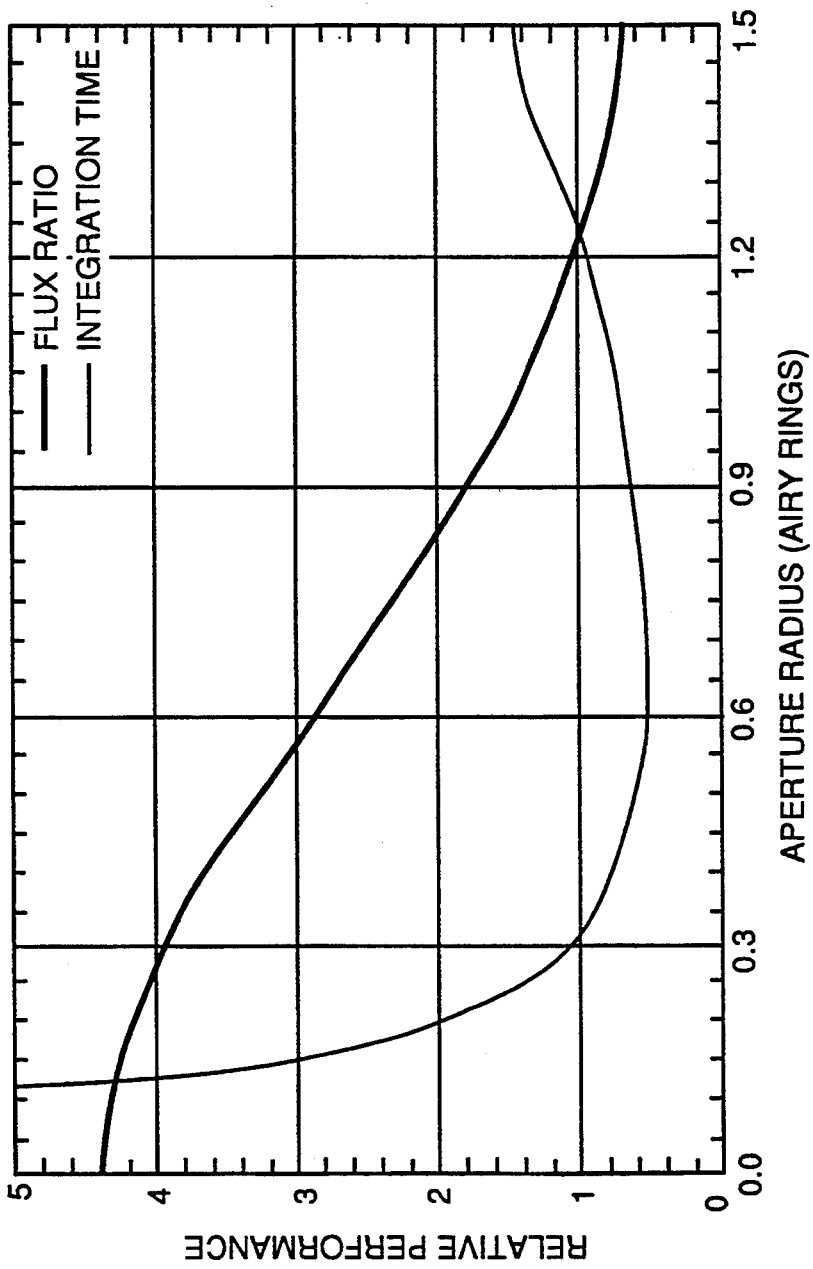
FIG. 4 shows a graph of the relative flux ratio and integration time as a function of aperture size.

FIG. 3a shows the effect of the coronagraph 2 on an ideal diffraction pattern with a five (5) ring Gaussian mask and an 80% Lyot stop. As is evident the diffraction sidelobe intensity has been reduced by nearly four orders of magnitude. FIG. 3b shows the effect of the coronagraph 2 parameters on a representation of the scatter tails due to a small amount (less than 0.1 waves) of system focus error. Note that unlike diffraction, the scatter due to focus error creates a scatter peak at a radius of about 0.07 arcseconds which, as can be seen in FIG. 3a, falls at about the peak of the first diffraction ring of the ideal pattern. In this case, the attenuation by the coronagraph is about three orders of magnitude, close to that of ideal diffraction. FIG. 3c shows the scatter effect of a small mount of Spherical Aberration. Here the scatter maximum falls at 0.1 arcsecond which is at the edge of the first diffraction ring. Now the effect of the coronagraph 2 is only a reduction of about two orders of magnitude in the scatter sidelobes.

Focus is a phase error that varies with the square of the pupil radius and spherical aberration is higher order and varies with the fourth power of the pupil radius. So for higher order aberrations it is found that the scatter effects peak further out in radius in the focal plane and the same fixed mask size is less able to cope with them. This is because the scatter enhancement falls closer to the mask edge. In this case increasing the mask size will result in larger reductions if needed. For a typical two mirror telescope the astigmatism (quadratic variation), coma (cubic variation), focus (quadratic variation) and spherical aberration (fourth power) are produced in the focal plane as a result of either misalignment of the optical instrument or conic misfiguring. According to these results the effects of these low order aberrations will be significantly diminished in the optical instrument when the coronagraph is used. According to the analysis these levels of reduction are sufficient but can be increased if it becomes necessary.

B. Improved Target Visibility By Optimizing Pixel Size

Another way to improve the performance of a coronagraph, is to optimize the pixel size of the receiving device, such as a camera 22, a photographic machine 20, or a CCD array (not shown), to improve the visibility of a faint target against a given background. Most importantly, the pixel size can be optimized with little or no loss in the integration time needed to image the target.

For example, in the presence of a nearly uniform background, smaller pixels allow for a more favorable balance of signal to background levels which improves target visibility This decreases the limiting brightness of sources that can be detected without increasing the aperture of the telescope. This makes the existing system more efficient at detecting faint sources.

This idea is particularly important to the planet search program, such as that done by the Astrometric Imaging Telescope, since it permits the detection of planets to a greater distance without increasing telescope aperture, and provides some relief to what has been the most demanding telescope requirement, namely the desire to image extra-solar planets. The concept can also be applied to any focal plane with similar target discrimination problems.

Pixel size has been discussed in the literature with respect to integration time or based on Modulation Transfer Function considerations. In this case, there is usually a clear minimum in integration time associated with a given target distribution. Systematic errors, however, rather than integration time ultimately limit the level of any background subtraction so we have applied this same concept to optimizing pixel size for target visibility which is the ratio of target photons to background photons.

When trying to detect faint sources in the presence of a large background there are two considerations that limit the detection. The first is the fundamental quantum mechanical limit improved by shot noise which drives integration time. The second is the systematic errors in the background subtraction which limit the detectable target level. Shot noise can always be reduced by integrating longer, but the systematic errors usually admit of no simple treatment. Thus, there is usually a fundamental detectability threshold set by the systematic errors in the background subtraction. This is equivalent to saying there is a limiting target to background flux level. For the case of a near diffraction limited source seen against a smoothly varying background, this flux level can be significantly improved by reducing pixel size without affecting most background subtraction systematic errors.

For example, if the background is approximated as constant over the size of a pixel, then the flux collected from the background is directly proportional to the size of the pixel. Moreover, if the target is an unresolved point source and the telescope is near diffraction limited, then the central lobe of the point spread function can be expected to be centrally peaked with a steep fall-off. The existence of a central peak implies that the mean target bright brightness averaged over the collecting region centered on the central peak of the point spread function must decrease as the size of that region increases in the vicinity of the origin. Thus, the largest mean target brightness occurs for minimal collecting area. The mean brightness of the background is assumed to be independent of collecting area. The flux ratio is the ratio of these two mean brightnesses and peaks for zero collecting area. In other words the optimal flux ratio occurs for zero pixel size which implies infinite integration time. But by the above arguments, any increase in pixel size to improve integration time must result in a decrease in flux ratio so these two system drivers can be traded against one another to obtain an optimal balance.

The standard formula of choosing two pixels per diffraction ring only assures that the spatial frequency content of the focal plane will be adequately sampled. Flux ratio and integration time concerns, however, are another issue and both could benefit from pixel downsizing. Below, the case of a diffraction limited, circular, unobscured pupil is discussed. It shows that the flux ratio can be improved by a factor of three with no penalty in integration time by significantly reducing pixel size. This reduction has several other advantages. For smaller pixels, the assumption of a uniform background is more applicable. In the case where the background is a nearby bright source, the steep fall-off of its diffraction pattern could be a problem. For a one-third reduction in pixel diameter the percent intensity change over the size of a pixel is reduced by a factor of three. Lastly, smaller pixels permit more accurate background models.

There are two noise sources in the detection of a planet that one needs to take into account: random and systematic. The random element is typified by the shot noise which represents a fundamental quantum limit on any detection. The systematic aspect of most concern is the subtraction of the background. With a background count of N, one can say that the noise is squareroot of N for an assumed perfect background subtraction. If the background is not perfectly subtracted, say leaving a residual of $\delta N$, then the noise is the rms of $\delta N$ and squareroot of N. By counting longer one can always improve the balance of signal to shot noise photons but the systematic noise stays at the same level. Ultimately all detections therefore are limited either by the level of systematic error in the experiment or noise sources that grow with time (1/f noise).

In the case of the AIT system, these two aspects of faint source detection are expressed by integration time t, and flux ratio, $\Phi$. The flux ratio is the ratio of the number of photons per second arriving from the background compared to the number arriving from the planet and is a measure of the visibility of the planet against the background. Integration time and flux ratio are not totally independent. The integration time is calculated assuming we are in the shot noise limit so as the flux ratio improves the integration time decreases. The integration time can be written as:

$$t \alpha \frac{\phi_B}{\phi_P^2} (S/N)^2 = \frac{\phi(S/N)^2}{\phi^P}$$

where $\phi_B$ is the ram at which photons are counted from the background, $\phi_P$ is rate at which photons are counted from the star and (S/N) is the require signal to noise ratio of the detection. It is clear from this equation that if the planet signal is held constant and the flux ratio is improved (i.e. reduced) the integration time is diminished. Detailed models and calculations show that in general, integration time limits detection at large field angles and flux ratio limits detection at small field angles.

Using the above equation, and the assumption of shot noise limited observations, given any $\phi_B$ and $\phi_P$, an integration time can be found to any required signal to noise. Integration time provides a reality bound that is estimated to see how long a given observation will lake, but $\Phi$ provides a different kind of bound on the detection. It is meant to characterize our ability to see a faint source against a bright background and essentially quantifies the difficulty of doing a background subtraction. To date bounds of order 100 have been used for the flux ratio based on the photometric precision of area detectors and past experience in ground based astronomy. However, whether it is one two or three hundred makes a significant impact on the number of stars since it is the flux ratio that ultimately sets the ability to detect planets around more distant stars.

The background level is a continuous distribution of diffracted and scattered light produced by the parent star. In order to calculate the flux from the background it is necessary to assume some sort of collecting area equivalent to a pixel in which the detection is to be made. All the modeling done to date on AIT assumes that the collecting area is equal to the AIRY disk of the planet. Therefore the planet flux is just 84% of all the photons arriving from the planet and the background flux is $$\phi_B \alpha \pi \left(1.22 \frac{\lambda}{D}\right)^2 I_B$$

where $\lambda$ is the wavelength of observation, D is the telescope aperture, and $I_B$ is the intensity of the background in the vicinity of the planet.

It is usual to assume a focal plane sampling of 2 pixels per $\lambda/D$ since this guarantees that the telescope cutoff frequency is Nyquist sampled. However, sine waves are not being detected in the image plane on which the transfer function characterization of the telescope is based, rather the resolution of the presence of two different sources as opposed to one is being sought. This is more reminiscent of the problem of super-resolution in which high density sampling of the focal plane is a must. In order to pursue this point a circular aperture of variable radius, r, centered on the planet is considered. The energy inside that radius is given by the telescope encircled energy function EE(r). The background coming from that aperture is $\pi r^2 I_B$ so the integration time and flux ratio are given by:

$$t \alpha \frac{\pi r^2 I_B}{EE(r)^2}$$

$$\Phi \alpha \frac{\pi r^2 I_B}{EE(r)}$$

If an assumption that r is measured in units of $\lambda/D$ then EE(r) is 0.84 when r=1.22 is used and the integration time and flux ratio can be normalized in tens of the values currently used in the program at r=1.22. then this gives:

$$\frac{t}{t_\Lambda} = \left(\frac{r}{1.22}\right)^2 \frac{0.84}{EE(r)}$$

$$\frac{\Phi}{\Phi_\Lambda} = \left(\frac{r}{1.22}\right) \frac{0.84}{EE(r)}$$

These relative flux ratio and integration times are shown in FIG. 6 as a function of radius for the known encircled energy function of a circular aperture. Inspection of this plot shows that for a circular aperture the encircled energy never grows as quickly as $\pi r^2$ so the flux ratio peaks at the origin (zero pixel size). The integration time behavior is more complicated. As the collecting aperture is closed down from the edge of the AIRY disk fewer planet photons are being collected but the mix of planet to star photons is growing more favorable so the integration time initially decreases. As the focal plane collecting aperture (see FIG. 1) is closed down further, however, the improvement in the flux ratio is not as significant and the overall loss of photons begins to dominate, driving the integration time to infinity.

The most significant aspect shown in this plot is that by going to smaller pixels one can make the planet more visible with little penalty (or even a gain) in integration time. In concrete terms the flux ratio contour currently labeled 100 in the AIT performance plots could really be labeled 30 without changing the integration time labels. This possibility represents an engineering margin that can be used in a variety of ways. The current AIT baseline could have enhanced performance and be a more powerful detection instrument, or one could get the current performance from a smaller telescope. The flux ratio scales like the square of the telescope aperture and the integration time scales like the fourth power of aperture so getting a factor of 3 improvement in flux ratio would permit the telescope to be decreased to about 60% of its current size with no flux ratio penalty and factor of 4.5 integration time penalty. Alternatively both flux ratio and integration time are proportional to the square of the mirror figure so this margin could be used to reduce mirror figure requirements by nearly a factor of two with no flux ratio penalty and a doubling of integration time.

The aforementioned embodiments described admirably achieve the object of the invention; however, it will be appreciated that other arrangements and configurations can be made by those skilled in the art without departing from the spirit and scope of the invention which is deemed limited only by the appended claims and the reasonable interpretation thereof.

We claim:

1. A improved method for reducing imaging sidelobes caused by low order aberrations caused by misalignment, component errors or the like for an imaging system used to detect a faint source in the presence of a bright source, the method of the type using a coronagraph having an occulting mask and lyot stop for reducing sidelobes caused by diffraction effects of the bright source, the improvement comprising the steps of:

providing on apodized occulting disk having a transmission profile which changes from opaque to transparent along its radius and an amplitude whose negative is a Gaussian profile to reduce sidelobes associated with the low order aberrations.

2. The method of claim 1 further comprising the steps of providing an apodized disk according to claim 1 wherein a desired RMS width for the Gaussian profile is determined according to the following steps:

determining predicted sidelobes associated with a set of low order aberrations using Zernike polynomials;

using a given RMS width for the Gaussian profile to determine an attenuation level for the predicted sidelobes;

adjusting the RMS width for the Gaussian profile until a desired attenuation level of the sidelobes is obtained to provide the desired RMS width for the Gaussian profile.

3. The method of claim 2 further comprising step of:

providing a occulting disk having a width selected to provide a predetermined field of view.

4. A method for reducing the aberration effects of misalignment and manufacturing errors in an astronomic system using a coronagraph or the like to detect a faint target in the proximity of a bright source, the method including the step of:

providing an occulting mask for the coronagraph, the occulting mask having a transmission profile which changes from opaque to transparent along its width and an amplitude whose negative is a Gaussian profile, the Gaussian profile having an RMS width selected to attenuate sidelobes caused by the effects by a desired amount, whereby tolerances for misalignment and manufacturing errors for the system can be relaxed.

5. A method of improving the visibility of a faint target in the presence of a bright source, the method using an imaging system including a coronagraph and a detector array including pixels, the method including the steps of:

(a) providing a set of parameters which characterize the detection capabilities for the system for a given pixel size;

(b) determining limits on integration times and flux ratios for given target visibility at the given pixel size;

(c) generating a simulated catalog of visibility metrics for each star in a candidate list of target stars;

(d) applying the limits on integration times and flux ratios to the visibility metrics to determine a subset of stars for which visibility is acceptable; and (e) adjusting the pixel size and repeating the foregoing steps (a)–(d) until a pixel size is determined such that the subset of visible stars attains a maximum given the limits on integration time and flux ratios.

6. The invention of claim 5 wherein the number of pixels in the imaging system is greater than $2\lambda/D$ where $\lambda$ is the wavelength under observation and D is system aperture size.

* * * * *